United States Patent [19]

Jensen

[11] 4,196,175

[45] Apr. 1, 1980

[54] PROCESS FOR REMOVING A BISULFITE SALT FROM AN AQUEOUS SOLUTION BY CHEMISORPTION

[75] Inventor: Harbo P. Jensen, San Rafael, Calif.

[73] Assignee: Chevron Research Company, San Francisco, Calif.

[21] Appl. No.: 960,343

[22] Filed: Nov. 13, 1978

Related U.S. Application Data

[63] Continuation-in-part of Ser. No. 756,453, Jan. 3, 1977, abandoned.

[51] Int. Cl.$^2$ .................... C01B 17/00; C01B 17/62; C02B 1/56
[52] U.S. Cl. .................... 423/242; 423/519; 210/37 R
[58] Field of Search ............ 210/37 R, 512 A, 512 R, 210/242 R, 242 A, 244 A, 244 R, 519; 536/104, 105

[56] References Cited

U.S. PATENT DOCUMENTS

| | | | |
|---|---|---|---|
| 2,880,236 | 3/1959 | Mehltretter et al. | 36/105 |
| 3,440,012 | 4/1966 | Walles et al. | 423/573 |
| 3,459,495 | 8/1969 | Iida et al. | 23/2 |
| 3,879,521 | 4/1975 | Anderson | 423/242 |
| 3,896,214 | 7/1975 | Newman | 423/242 |
| 3,916,025 | 10/1975 | Kunin | 423/242 |
| 3,932,589 | 1/1976 | Teller | 423/243 X |
| 3,937,795 | 2/1976 | Hasebe | 423/243 |
| 3,959,452 | 5/1976 | Espenscheid et al. | 423/573 G |

FOREIGN PATENT DOCUMENTS 1010883  8/1963  United Kingdom ............ 423/519

OTHER PUBLICATIONS

Chem. Abstracts, vol. 41, 1947, 3330.
Amberlyst Hi Lites, Kunin, Nov. 1963.

*Primary Examiner*—O. R. Vertiz
*Assistant Examiner*—Gregory A. Heller
*Attorney, Agent, or Firm*—D. A. Newell; R. H. Davies; M. K. Bosworth

[57] ABSTRACT

A process is provided for removing a bisulfite salt from an aqueous solution by chemisorbing the salt onto a macroreticular organic compound containing carbonyl functional groups and regenerating the compound.

25 Claims, 2 Drawing Figures

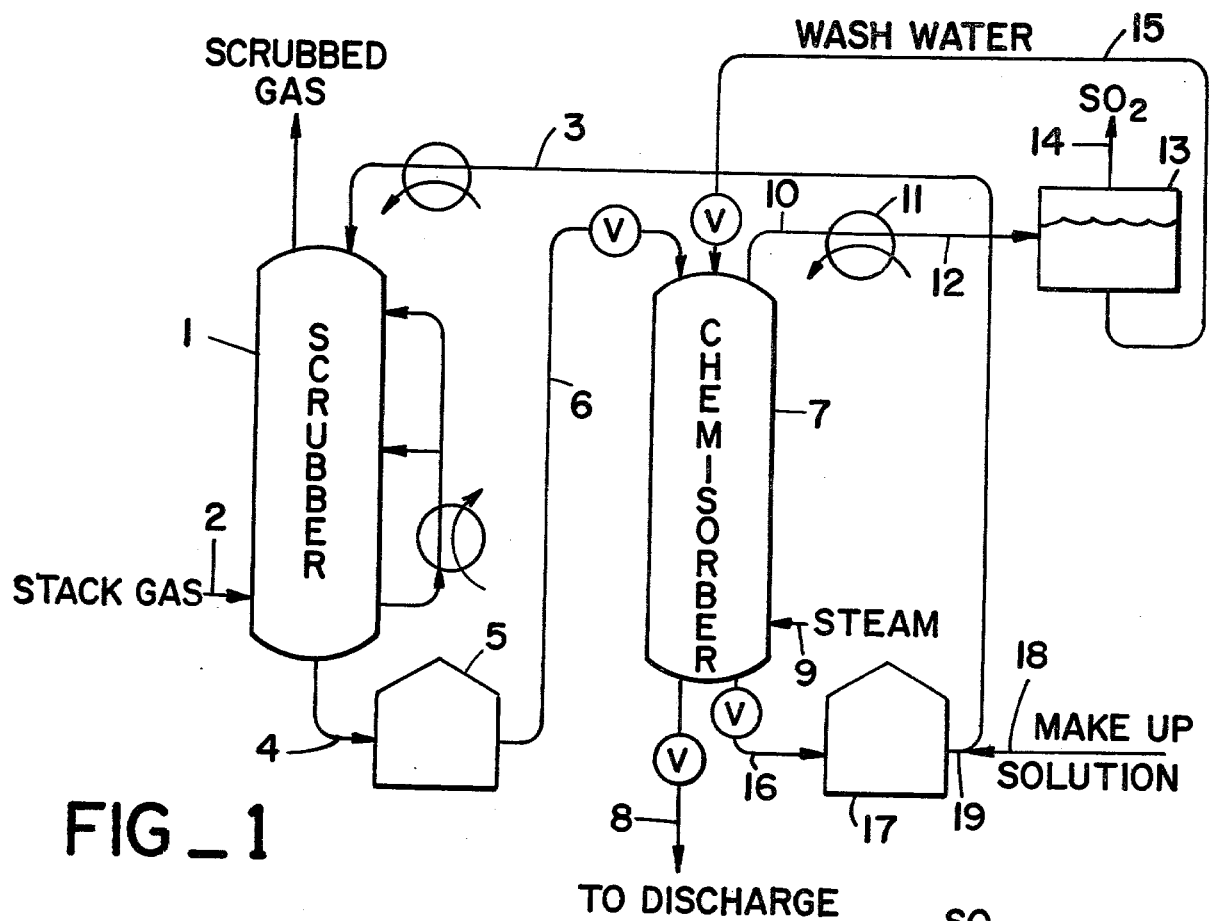
FIG_1
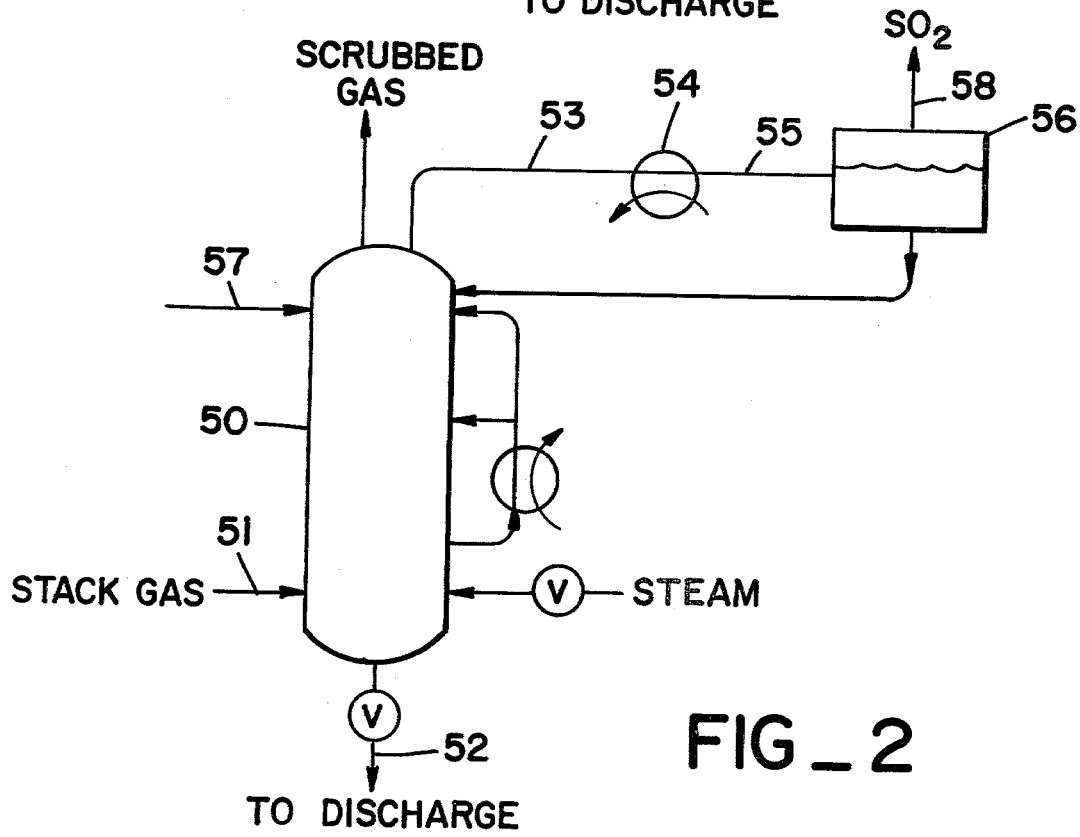
FIG_2

PROCESS FOR REMOVING A BISULFITE SALT FROM AN AQUEOUS SOLUTION BY CHEMISORPTION

CROSS REFERENCE TO RELATED APPLICATION

This application is a continuation-in-part of Ser. No. 756,453, filed Jan. 3, 1977 now abandoned.

BACKGROUND OF THE INVENTION

This invention relates to a process for reducing the bisulfite salt content of an aqueous solution. More particularly, it relates to removing alkali metal and/or ammonium bisulfites from an aqueous solution by contacting the solution with a macroreticular organic compound containing carbonyl functional groups which form adducts with the bisulfite salts. Still more particularly, it relates to a process for removing sulfur dioxide contaminant from a gas, including a step in which a bisulfite salt is removed, as above described, from an aqueous solution.

Water-soluble sulfite and bisulfite salts are known and used in the chemical industry. For example, aqueous sodium sulfite is used to scrub sulfur dioxide from a gas, and sodium and magnesium bisulfite solutions are used to bleach wood, paper and the like. Often by-product and/or water streams from these uses contain residual sulfite and/or bisulfite salts. These residues are undesirable (1) as representing unused and costly materials, and (2) as pollutants of the environment. There is a need for reducing the loss of these materials and/or for reducing pollution of the environment by these materials. There is a further need, as will be clear from the description to follow, for a more effective use of sulfite in the removal of sulfur dioxide from a gas, such as a flue gas.

Ion exchange processes for the removal of bisulfite ions are known to the art, for example, U.S. Pat. Nos. 3,879,521 and 3,896,214, and involve the exchange of a bisulfite ion in a solution for ions such as hydroxide ions in ion-exchange resins. The spent resins are regenerated by contact with a hydroxide solution. In contrast, chemisorption of bisulfite salts with a compound containing adduct-forming carbonyl functional groups involves the addition of the bisulfite salts to the carbonyl group as an adduct, not exchange of the bisulfite ion for another ion.

An in-situ formation of a naphthoquino chelate has been effected by reacting water-soluble anthroquinone with sodium bisulfite to form a naphthoquinone sulfonate which is then converted to a naphthoquino chelate compound, see U.S. Pat. No. 3,937,795, column 17. Also, quinones and quinonyl compounds have been used as catalysts for oxidation of hydrogen sulfide and mercaptans to elemental sulfur, as described in U.S. Pat. Nos. 3,937,795; 3,440,012; 3,459,495 and 3,959,452.

It is an object of this invention to provide a process for recovering sulfite and bisulfite values from aqueous solutions thereof. A further object is to provide a process for removing contaminating sulfur dioxide from a gas. Other objects will be clear from the description and examples below.

SUMMARY OF THE INVENTION

A process is provided for removal of bisulfite salt from an aqueous feed solution thereof, which comprises forming an adduct of said salt with a macroreticular solid compound, preferably an organic polymer which contains adduct-forming functional carbonyl groups, there being at least 0.1, preferably at least 3 milliequivalents of adduct-forming functional group per gram of compound, to form an adduct of said bisulfite salt with said compound and withdrawing the resulting residual aqueous solution from contact with said compound.

Preferably, the adduct formation occurs at adduct-formation conditions including:

(a) a temperature in the range from about 10° C. to about 200° C., more preferably 20° to 150° C. and still more preferably 40° to 100° C., (b) a pH in the range from about 1 to 8, and more preferably 1.5 to 7.5 and still more preferably 2 to 7, and (c) a pressure at least sufficient to maintain said solution.

Preferably, the process includes the additional step of regenerating the resulting bisulfute salt-adducted compound by treating said adducted compound under sulfur dioxide-releasing conditions.

A process is provided for removing a bisulfite salt from an aqueous solution thereof, by chemisorbing said salt onto a macroreticular solid organic compound, preferably a polymer, which contains adduct-forming carbonyl groups.

Another aspect of the present invention is a process for removing sulfur dioxide from a sulfur dioxide-contaminated gas which comprises reacting the sulfur dioxide with a reactant to form a bisulfite salt and chemisorbing the bisulfite salt onto a macroreticular solid organic compound which contains a carbonyl functional group. In a preferred feature of this aspect, (1) said bisulfite salt is formed as a bisulfite-enriched solution by contacting in a gas scrubbing zone said gas with an aqueous scrubbing solution, said solution containing at least one reactant selected from the group consisting of ammonium, magnesium and alkali metal sulfites, carbonates, hydroxides and mixtures thereof; and (2) each gram of said compound contains at least about 0.1 milliequivalent of a bisulfite salt adduct-forming carbonyl functional group.

Another preferred feature of this aspect is that chemisorbing occurs in a chemisorbing zone at chemisorbing conditions including:

(a) a temperature in the range from about 10° C. to about 200° C., preferably 20° to 150° C. and still more preferably from 40° to 100° C., (b) a pH in the range from about 1 to 8, preferably 1.5 to 7.5 and more preferably 2 to 7, and (c) a pressure at least sufficient to maintain said solution.

Yet another preferred feature of this aspect is the additional step of regenerating the compound by removing sulfur dioxide therefrom.

In a more particular aspect of the invention, a process is provided for recovering contaminating sulfur dioxide from a gas, comprising:

(1) forming a bisulfite-enriched solution and a residual gas by contacting in a gas scrubbing zone said gas with an aqueous scrubbing solution, said solution containing at least one reactant selected from the group consisting of ammonium, magnesium and alkali metal sulfites, carbonates, hydroxides and mixtures thereof, said residual gas containing less sulfur dioxide per unit volume than said gas;

(2) removing bisulfite salt from said enriched solution by contacting said solution with a macroreticular compound in a chemisorbing zone, said compound containing for each gram thereof at least about 0.1, preferably at least 3, milliequivalent of a bisulfite salt adduct-forming carbonyl functional group, and said contacting being (a) at a temperature in the range from about 10° C. to about 200° C., preferably from 20° to 150° C., and still more preferably from 40° to 100° C., (b) at a pH in the range from about 1 to 8, preferably 1.5 to 7.5 and more preferably 2 to 7, and (c) at a pressure at least sufficient to maintain said solution; and (3) regenerating said macroreticular compound by treating said adducted compound under sulfur dioxide-releasing conditions.

In another aspect of the invention, the bisulfite salt solution is generated and bisulfite salt is adducted concurrently in a common sulfur dioxide absorber and bisulfite adducting reaction zone containing the macroreticular organic compounds, either in fixed bed or fluid bed relationship, in contact with an aqueous solution containing at least one reactant selected from the group consisting of ammonium, magnesium and alkali metal sulfites, carbonates, hydroxides and mixtures thereof. Regeneration of the adducted compound is effected in any convenient manner, for example, in-situ or ex-situ of said zone, using the regenerating means described herein or the like.

By "sulfur dioxide contamination" as used herein is meant a minor content of sulfur dioxide, usually less than about 10 volume percent.

By "chemisorbing" as used herein is meant forming an adduct of addition group, for example, as illustrated in the following Equation 1.

Water-soluble bisulfite salts, in general, are removed from aqueous solutions thereof by the process herein. Aqueous solutions containing one or more bisulfite salts are, in general, effectively treated for removal of dissolved bisulfite salts by the process herein, and such are contemplated for use as feeds to the process.

Macroreticular organic compounds which contain at least 0.1 milliequivalent per gram of compound, preferably at least 3 milliequivalents per gram, of one or more kinds of bisulfite adduct-forming carbonyl functional groups, are satisfactory for use herein and are contemplated for such use. The carbonyl groups may be an integral part of the compound backbone, in pendant groups, or both. It should be recognized that "organic compound" is intended to mean compounds comprising one or more carbon atoms. Thus, a compound comprising carbonyl functional groups pendant from a macroreticular inorganic support is included in this definition. Adduct formation where aldehydic functional groups are involved may be represented by the following equation:

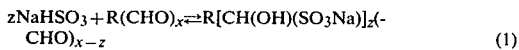

where R is the backbone of a macroreticular organic compound, x and z are whole numbers, and z is equal to or less than x.

The carbonyl functional group may be represented by the formula

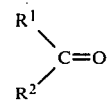

in which R' is selected from H, primary and secondary carbon atoms, cyclic and aromatic carbon rings, whether in the hydrogen or substituted form, as well as a part of the backbone of the macroreticular compound. $R^2$ is the backbone of the macroreticular compound or a portion thereof. $R^1$, if in the form of a secondary carbon atom, is preferably a part of a ring compound formed with $R^2$ so as to avoid stearic hindrance of the carbonyl functional group.

Representative carbonyl functional groups include formyl, ketonyl, including cycloaliphatic ketonyl groups and quinonyl groups such as benzoquinone, naphthaquinone and anthraquinone, cyclohexanonyl, acetyl, perfluoroacetyl, and the like groups. Formyl (—CHO), ketonyl (R—CO—R), acetyl (—COCH₃) and perfluoroacetyl (—COCF₃) carbonyl groups are preferred pendant functional groups.

DESCRIPTION OF THE FIGURES

FIG. 1 is a schematic process flow diagram of one embodiment of the present invention in which a scrubber and a chemisorber are shown.

FIG. 2 is a schematic process flow diagram of another embodiment of the present invention in which a single contact zone is used as a scrubber and chemisorber.

EMBODIMENT OF THE INVENTION

In a preferred embodiment, sodium bisulfite is recovered from an aqueous solution which also contains sodium sulfate. The latter salt in significant concentration in a primarily sulfite salt solution interferes with a desired use for the sulfite, for example in adsorbing sulfur dioxide from a stack gas. In the process described in U.S. Pat. No. 3,962,405, and in related processes, a bleed stream is required to keep the sulfate concentration in an aqueous solution at or below a permissible upper level, for example below about 1 part (weight) of the sulfate per 5 parts of bisulfite. Such a bleed stream is a purge stream or a precursor to a purge stream which is normally produced in a process wherein sulfur dioxide contaminant is absorbed from a gas, for example a stack gas containing sulfur dioxide, and a minor amount of sulfur trioxide, by contacting the gas with aqueous sodium sulfite, the adsorption reaction being $$Na_2SO_3 + SO_2 + H_2O \rightarrow 2NaHSO_3 \tag{2}$$

This reaction is reversed by heating the aqueous solution at an elevated temperature, thereby permitting recovery of a concentrated sulfur dioxide gas and regenerating the absorbing solution. Any sulfur trioxide in the gas and/or any oxidation of sulfite, on the other hand, forms sodium sulfate, which, as its concentration increases, reduces the usefulness of the sodium sulfite solution. Normally, when the sulfate to sulfite ratio reaches about 1 to 5, as noted above, there is a real need for purging, although clearly the purge stream contains much potentially useful sulfite salt.

In the present embodiment, the sulfur dioxide-rich absorbing solution at a temperature in the range of from about 70° to 90° C., a pH of about 4 and a liquid hourly space velocity (V/V/Hr) of about 1, is contacted with a suitable macroreticular solid organic compound, for instance, an organic polymer, in a fixed-bed contacting zone. This polymer desirably contains at least about 3 milliequivalents of the perfluoroacetyl (CF$_3$CO—) functional group per gram thereof. The resulting aqueous effluent stream which is withdrawn from the contacting zone contains little or no bisulfite. For practical purposes, this stream is but aqueous sodium sulfate solution which may be discharged with little or no pollution of the environment and little or no loss of useful sodium sulfite or sodium bisulfite values.

The bed of polymer which contains chemisorbed sodium bisulfite is regenerated in 1 to 3 hours, for example, by passing a stream of wet steam at about 115° C. through the bed. The steam may contain a trace of sulfur dioxide. The reaction for the regeneration may be represented as follows:

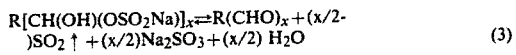

$$R[CH(OH)(OSO_2Na)]_x \rightleftharpoons R(CHO)_x + (x/2\text{-})SO_2 \uparrow + (x/2)Na_2SO_3 + (x/2) H_2O \quad (3)$$

where R, as above, is the polymer backbone. The liberated sulfur dioxide, together with steam and/or condensed steam, is withdrawn from the contact zone. The water vapor in large part is condensed from the sulfur dioxide by cooling and the sulfur dioxide is recovered or further processed as desired. The sodium sulfite salt formed during the regeneration is water-washed from the bed of polymer. The resulting aqueous solution is suitable for use as a gas-scrubbing solution, for bleaching or the like. The regenerated polymer bed is then ready for another cycle of use in chemisorbing bisulfite salt from an aqueous solution.

In a further embodiment, sulfur dioxide is adsorbed from a sulfur-dioxide-containing gas, for example a stack gas, by contacting an aqueous sulfite solution by any suitable gas-liquid contacting method (see U.S. Pat. No. 3,962,405 and the references cited therein for representative methods), for example as illustrated in the FIG. 1, which is a schematic process flow diagram. In this embodiment, the stack gas is introduced into gas scrubber 1 via line 2 and into contact with an aqueous solution sulfite scrubbing solution which is introduced into the scrubber via line 3. The contacting is at a temperature of about 95° C. and a liquid hourly space velocity which results in satisfactory conversion of the sulfite content of the scrubbing solution to bisulfite and a satisfactory removal of SO$_2$ from the stack gas (see equation (2) above). Via line 4, the sulfur dioxide-rich solution is withdrawn from scrubber 1 and passed to surge or intermediate storage vessel 5.

Vessel 7 is a chemisorber for removing bisulfite from the sulfur dioxide-rich solution generated in scrubber 1. This unit is alternately operated in chemisorbing or regenerating modes. As a variation from the process of the FIG. 1, two or more chemisorber units may be employed for switch operation in these modes. With unit 7 operating in the chemisorbing mode, solution is withdrawn from vessel 5 and passed via line 6 to chemisorber 7, where it is contacted with a fixed bed of the macroreticular polymer, the contacting being at a temperature of about 95° C. and liquid hourly space velocity of about 1. The bisulfite content of the chemisorber feed solution is fixed by the reaction described in equation (1) above. The effluent water stream, which is withdrawn from chemisorber 7 for discharge via line 8, contains little or no bisulfite but contains any sodium sulfate, sodium sulfite, and/or any other dissolved salts which may be present in the feed solution. Where the sulfate content of the solution withdrawn via line 8 is not excessive and as a matter of conserving process water and sodium sulfite values, the effluent stream or any portion thereof, as desired, may be recycled to the process in any suitable manner, for example in preparing make-up solution.

When chemisorber 7 is operated in the regenerating mode, the introduction of feed to chemisorber 7 via line 6 is discontinued and wet steam at about 115° C. is introduced into unit 7 via line 9. This steam may contain a minor amount (0.5 to 10 volume percent, preferably 0.5 to 2) of sulfur dioxide, the latter which seems to promote the dissociation of the chemisorbate in a reaction described in equation (3) above. The sulfur dioxide released by the reaction is withdrawn from unit 7 in admixture with steam via line 10. The water in line 10 is condensed to liquid by means of indirect heat exchanger 11 and the resulting gas-liquid mixture is passed via line 12 to gas-liquid separator 13. The separated sulfur dioxide gas is withdrawn from separator 13 via line 14 for use and/or recovery as desired.

The use of a chemisorber as herein for the removal of bisulfite from the gas scrubbing solution is advantageous relative to conventional sulfur dioxide removal methods for a number of reasons, including: (1) the energy required to regenerate an aqueous sulfite gas-scrubbing solution is much more than is that required to regenerate a macroreticular compound containing adducted bisulfite as described above; (2) a substantial loss of sulfite values (as in the conventional case where a purge stream containing sulfite species is required) is avoided; and (3) there may be little or no sulfate salt present in the recycled gas-scrubbing solution.

After completion of the steaming and sulfur dioxide removal from the polymer as described above, the regenerated polymer is water-washed using any suitable water, for example at least a portion of the condensate collected in separator 13 which is passed to chemisorber 7 via line 15. (As an alternate, water discharged from the system via line 8 may be used as all or part of the regenerated polymer wash-water.) By this washing, sodium sulfite liberated by the above-described steaming is dissolved and removed from the polymer and then passed via line 16 to surge and/or intermediate storage vessel 17. As required for the gas scrubbing in scrubber 1, aqueous sulfite solution from vessel 17, together with suitable makeup solution, for example, aqueous sodium hydroxide or carbonate solution, added as required from line 18, is passed to scrubber 1 via lines 19 and 3.

In a yet further embodiment, a single reactor or contact zone is used as a combustion gas scrubber and chemisorber. FIG. 2 is a schematic process flow diagram illustrating this variation of the invention. In this case, vessel 50 is charged with a fixed bed of a suitable macroreticular polymer. It is also charged with aqueous sodium sulfite gas scrubbing solution. Via line 51, stack gas is introduced into vessel 50 and into contact therein with the aqueous sulfite solution which surrounds the polymer. The contacting of the stack gas is carried out at about 95° C. and is continued until the bisulfite-chemisorbing capacity of the solid polymer is more or less reached. At this point, the stack gas is fed to a similar unit, not shown, and any residual solution in vessel 50 is withdrawn via line 52 for discharge. The chemisorbed polymer in vessel 50 is then regenerated by introducing steam at about 115° C., as described above, into contact with the polymer. A mixture of liberated sulfur dioxide gas and water vapor is withdrawn from vessel 50 via line 53 and passed into contact with indirect heat exchanger 54 with resulting condensation of the water vapor. Via line 55 the mixture of liquid water with any sulfur dioxide gas is passed to separator 56. When little or no sulfur dioxide is present in the effluent in line 53, the steaming is discontinued. Condensate water from separator 56 (or line 52 discharge water—see discussion above re line 8 discharge water use) is passed to vessel 50 to dissolve sodium sulfite liberated by the regenerating unit and to reconstitute the aqueous sodium sulfite gas-scrubbing solution. Makeup sodium sulfite solution, as required, is introduced into reactor 50 via line 57. During the regeneration, sulfur dioxide is withdrawn from separator 56 via line 58 for recovery or further processing as desired.

Macroreticular Compounds

Macroreticular compounds are characterized by the fact that they have a porous, cross-linked structure, which structure is now well known. Although the macroreticular compound is preferably an organic polymer, it may be any suitable cross-linked organic or inorganic substance, or mixtures thereof, which are stable under the conditions employed in the process of the present invention. Exemplary inorganic substances are silanes, functionalized alumina, functionalized silica, and sulfur. The preferred organic substances are organic polymers, and more preferably, macroreticular acrolein, dialdehyde starch, polystyrene or polyvinyl alcohol. Methods for forming or producing such polymers are described, for example, in detail in U.S. Pat. No. 3,586,646 and in British Pat. Nos. 932,125 and 932,126. Other methods apparent to those skilled in the art can also be used, for example the swelling-solvent technique taught in U.S. Pat. No. 3,586,646, or the salt water-precipitated technique. In general, for the production of a carbonylic polymer, a suitable cross-linking agent, frequently a polyvinyl aromatic compound, is copolymerized with a monoethylenically unsaturated aldehyde or methylketone, such as acrolein and the like. If desired, the wetability of the macroreticular compounds may be increased by the addition of hydrophilic groups such as sulfonate or carboxylate.

When the macroreticular polymer contains pendant carbonyl functional groups, the cross-linked polymer may be formed first and then the carbonyl-containing functional groups subsequently added, for example, by a condensation reaction. Alternatively, carbonyl-containing monomer or monomers may be polymerized in the presence of a suitable cross-linking agent, frequently a polyvinyl aromatic compound. Of course, instead of polymerizing a carbonyl-containing compound, a compound which can later be converted to a carbonyl functional group may be used, then subsequently converted by known methods. For example, instead of using a benzoquinone having an alkenyl or alkynyl substituent as a reactant, a benzohydroquinone may be used and subsequently oxidized to benzoquinone by common methods such as air blowing, or reaction with hydrogen peroxide, permanganate or ferric salts.

For production of a polymer containing carbonyl functional groups integral with the polymer backbone, a carbonyl-containing monomer or a monomer which contains a group that can be subsequently converted to a carbonyl group can be reacted with itself or with one or more co-monomers, and a cross-linking agent.

Each polymer will have its own type of optimum cross-linking agent, and a suitable match will be known to the skilled worker in the art. In general, the cross-linking may be carried out at the time the polymer backbone is formed or at the time when a carbonyl functional group is added. Ordinarily, the amount of cross-linking agent used will vary in a range from about 0.5% to 50% by weight, as based on the total amount of monomers used. More preferably the cross-linking will vary from about 2% to 20%, and even more preferably from about 3% to 10% by weight. Suitable cross-linking agents comprise the polyethylenically unsaturated compounds (that is to say, compounds containing at least 2 vinylidene ($CH_2=C<$) or ethylene ($-C=C-$) groups, such as, for example, divinylbenzene, trivinylbenzene, ethylene glycol dimethacrylate, ethylene glycol diacrylate, divinyl ether, and the like cross-linking agents which will readily be apparent to those skilled in the art. One particularly preferred carbonylic polymer is prepared by suspension copolymerizing in water a mixture of acrolein, divinylbenzene and toluene.

The macroreticular porous compounds should have a surface area of at least about one square meter per gram, a porosity or pore volume of at least about 10% and at least a major fraction of the pore volume in pores having diameters (B.E.T. method) above about 40 Angstroms. The surface area may range upwards to several hundred or more square meters per gram, the porosity may extend to 50% to 60%, and the pore diameter may range up to several hundred Angstrom units or even thousands of Angstrom units.

Aqueous solutions, in general, which contain sulfite and/or bisulfite salt solutes are satisfactory feeds for the process herein and are contemplated for such use. In particular, industrial waste water or by-product streams containing these salts are especially suitable, for example spent sulfite gas-scrubbing solutions, wood pulp processing sulfite liquors, and the like. If desired, sulfite salts in the aqueous solution can be converted to bisulfite salts before any bisulfite is removed therefrom, or before a subsequent bisulfite removal step.

Gases contaminated by minor amounts of sulfur dioxide are, in general, effectively treated by the process herein for the removal of sulfur dioxide, and such gases are contemplated as feeds. Representative gases, in general, include combustion gases resulting from combusting sulfur-containing fuels, for example furnace gas, stack gas, flue gas, waste gas, and the like gases, off-gas from roasting sulfur-containing mineral ores, fuel gases contaminated with sulfur dioxide, and tail gases from sulfur plants such as Claus plants.

Temperature (Chemisorption)

Bisulfite adduction (chemisorption) and regeneration of the macroreticular compound is a reversible reaction [see equations (1) and (2) above]. An appreciable reaction rate is notable at about 0° C. The rate increases with increasing temperature, and especially suitable chemisorption is experienced at temperatures in the range from about 5° C. to 150° C., more preferably 20° C. to 140° C., and still more preferably 20° to 100° C. Excellent chemisorption rates are also experienced above about 150° C., but as the temperature is raised further, the reaction equilibrium shifts in the direction of the dissociated reactants (left-hand side of the equations), until at about 200° C. there is little or no advantage from increasing the reaction temperature.

Regeneration

In the regeneration of the bisulfite-adducted macroreticular compound some dissociation, of course, occurs from simple heating, especially when released sulfur dioxide is concurrently carried away in a flowing stream of carrier gas. Satisfactory regenerating temperatures vary depending upon the method used and are, in general, in the range of from about 0° to 160° C. Preferred regenerations are carried out at a temperature or temperatures in the range of from about 20° to 160° C., more preferably 100° to 150° C. Both acid and base in minor amounts appear to catalyze the desired dissociation and are satisfactory for use herein.

As a practical matter, regeneration of the bisulfite-adducted compound is especially satisfactory when effected by steaming. If desired, steam containing a trace of sulfur dioxide may be passed through the adducted macroreticular compound while maintaining a suitable dissociating temperature. Other ways of regenerating the bisulfite-adducted compound include water-washing thereof with aqueous solution containing stoichiometric amounts of organic and/or mineral acid, or of a base, for example, ammonium hydroxide, sodium hydroxide and the like bases.

EXAMPLES

The invention will be further illustrated by the following examples, which are intended to be illustrative only and are not intended to place any limitation on the invention.

EXAMPLE 1

Macroreticular Polymer Preparation

A representative macroreticular polymer was prepared by the suspension polymerization method. A suspension medium was prepared by dissolving in about 330 mls of water a trace (0.16 g) of xanthum gum and a trace (0.003 g) of hydroxypropyl guar gum. Next, toluene (100 g), acrolein (164 g) and divinylbenzene (36 g) were added to the suspension medium and finally about 134 g of sodium chloride. The resulting mixture was then cooled to about 12° C., and then about 3 g of t-butyl perneodecanoate were added. The mixture was stirred rapidly, and because the resulting suspension was somewhat unstable, additional (about 0.1 g) guar gum dissolved in water was added.

With efficient stirring, copolymerization of the acrolein and cross-linking agent, divinylbenzene, was initiated and carried out by heating the suspension to about 48° C. After about 24 hours at this temperature (subsequent runs showed only a few minutes of contacting are necessary), the resulting product, which was a mixture of white solid and suspension medium, was cooled and filtered. The recovered solid was washed with water, then with ethanol, and vacuum-dried. The resulting macroreticular polymer had the following characteristics:

| | |
|---|---|
| Macropore content[1], % of P.V. in pores 1000 A. and above diameter | 2 |
| Micropore content[1], % of P.V. in pores below 1000 A. in diameter | 93 |
| Infrared spectrum, 1705 cm$^{+1}$ (carbonyl) | strong |
| Aldehyde group content, meq. gram | ca. 15 |
| Particle size, % of product: | |
| 35 or smaller mesh | 9.2 |
| 35–60 mesh | 40.2 |
| 60 or larger mesh | 50.6 |
| Analysis, weight percent | |
| Carbon | 61.88 |
| Hydrogen | 7.45 |
| Oxygen | Balance |

EXAMPLE 2

Bisulfite Salt Adduction

A portion of the macroreticular polymer produced in Example 1 was contacted with aqueous sodium bisulfite solution at the reflux temperature of the solution. The separated and dried solid was found to have a sulfur content of 11±1%.

EXAMPLE 3

Polymer Regeneration

A portion of the adducted polymer produced in EXAMPLE 2 was regenerated by heating at about 100° C. in an atmosphere of steam for about 20 hours. The cooled and dried polymer had a sulfur content of about 0.7 weight percent.

EXAMPLE 4

Polymer preparation

Macroreticular polymer was prepared as in EXAMPLE 1, except that the toluene occluded in the freshly prepared polymer was removed by evaporation. The resulting macroreticular polymer, based upon particle and skeletal densities, had a pore volume of 0.83 cc per gram and a total pore volume and pore size distribution, as determined by the mercury method:

| | |
|---|---|
| Total pore volume, cc/gram | .78 |
| Macropores, % of P.V. | 32 |
| Micropores, % of P.V. | 68 |

EXAMPLE 5

Polymer Regeneration Using Mineral Acid or Sulfur Dioxide

A macroreticular polyacrolein was contacted with aqueous sodium bisulfite solution and was found to have sulfur content of 11.7% weight. When this adduct was immersed in aqueous HCl at room temperature, the evolution of sulfur dioxide was evident. About 70 weight percent of the adducted bisulfite salt was removed by the room-temperature (ca. 20° C.) treatment.

When sulfur dioxide was passed through an aqueous slurry of the above adducted polymer at room temperature, there was about a 60% removal of sulfur.

When the above aqueous slurry was heated at the reflux temperature and sulfur dioxide was bubbled through the slurry, somewhat more of the adducted sulfur dioxide was liberated.

EXAMPLE 6

Macroreticular Polymer Preparation

A further representative polymer was prepared using dialdehyde starch, a commercially available material. In the preparation, a mixture of this starch, urea and water was reacted. For each 97 parts by weight, the mixture contained 3 parts of urea and sufficient water to provide a stirrable slurry.

EXAMPLE 7

Bisulfite Salt Chemisorption

A portion of the macroreticular polymer prepared in Example 6 was contacted with aqueous sodium bisulfite solution. After filtration, washing and drying, the adducted polymer had a sulfur content of 15% by weight. The theoretical sulfur content, assuming every carbonyl group had reacted, was 17.4% weight. Accordingly, about an 86% of theory bisulfite salt adduction had occurred.

EXAMPLE 8

Preparation of Polymer with Pendant Quinone

As described in Chemical Abstracts, Vol. 83, No. 79962k (1975), a p-formylstyrene polymer was formed by polymerizing p-chloromethylstyrene with hexamethylenetetramine. 0.5 grams of p-formyl styrene polymer was mixed with 0.1 gram amino-anthraquinone in a dioxane-tetrahydrofuran solvent. The mixture was refluxed for 3 hours and 0.3 g of a red polymer powder (I) was obtained—polystyrene p-methyliminoanthraquinone.

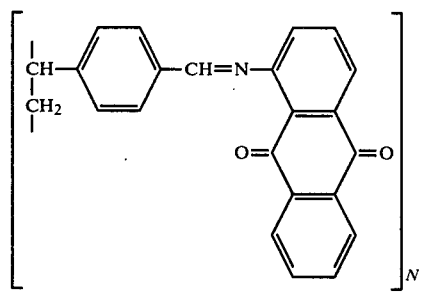

(I)

When the polymerization of p-chloromethylstyrene and hexamethylenetetramine is carried out in the presence of a cross-linking agent such as divinyl benzene, and the resulting cross-linked polymer reacted with the aminoanthraquinone, the resulting macroreticular quinone-containing polymer will be useful in the process of the present invention.

EXAMPLE 9

Preparation of Polymer with Integral Quinone

As described in Chemical Abstracts, Vol. 82, No. 98433j (1975), carbazole was reacted with pyromellitic anhydride in the presence of $AlCl_3$ at 20°–100° C. for 3–15 hours to yield poly(keto acids) containing groups such as (II) as well as

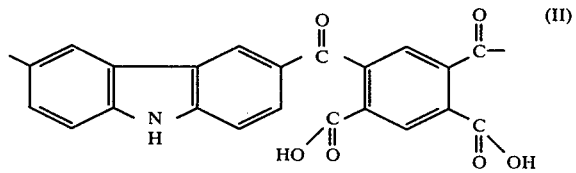

(II)

quinone groups. The poly(keto acids) were heated in vacuum at 280°–300° C. for three hours to form polyquinone polymer (III).

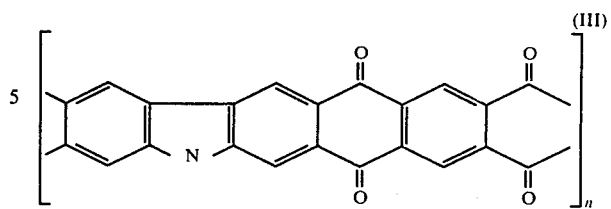

(III)

When this polymerization is carried out in the presence of a suitable cross-linking agent, e.g., a dibasic acid such as succinic acid, adipic acid and terephthalic acid or their acid chlorides, the resulting quinone-containing polymer will be useful in the process of the present invention.

EXAMPLE 10

Preparation of Polymer with Integral Quinone

As described in Chemical Abstracts, Vol. 76, No. 4196K (1972), terephthalohydroxamoyl chloride was condensed in aromatic solvents with 1,4-benzoquinone to give paraphenylene diisoxazolobenzoquinone polymer (IV):

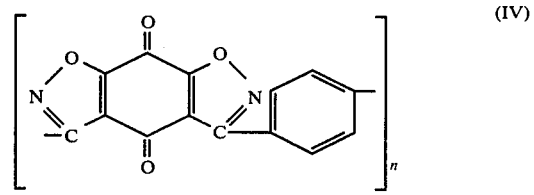

(IV)

This reaction can be carried out in the presence of a cross-linking agent such as pyromellitic acid tetrachloride or terephthalyl acid dichloride to give a cross-linked macroreticular organic polymer containing quinone functional groups in the backbone of the polymer, which polymer will be useful in the process of the present invention.

EXAMPLE 11

Preparation of Polymer with Integral Quinone

As described in Chemical Abstracts, Vol. 77, No. 88893s (1972), benzohydroquinone is polymerized in aqueous KOH to produce a 2-phenyl hydroquinone polymer. When this polymer is cross-linked by treating with a Lewis acid such as $AlCl_3$ and a dibasic acid such as succinic or adipic acid or their acid chlorides, the resulting hydroquinonyl polymer can be oxidized to yield a cross-linked 2-phenyl benzoquinone polymer, which is suitable for use in the process of the present invention.

EXAMPLE 12

Preparation of Polymer with Pendant Quinone

As described in "Ion Exchange", by Friedrich Helfferich, McGraw Hill Book Company, Inc., San Francisco, CA. 1962, on pages 551 to 568, a cross-linked resin containing pendant quinone functional groups can be prepared by esterification of vinyl hydroquinone with benzoic acid, and polymerizing the resulting esters with styrene and divinyl benzene to form a cross-linked polymer. The esters are then hydrolyzed and the resulting hydroquinone oxidized to form a cross-linked resin containing pendant benzoquinone functional groups which is useful in the method of the present invention.

EXAMPLE 13

Chemisorption of Bisulfite by Quinone

One gram of naphthoquinone is slurried in 10 ml of water at room temperature, forming a yellow-brown slurry. Two grams of sodium bisulfite are added to the slurry and stirred thoroughly. Most of the material in the slurry dissolves, the color vanishes as a small amount of heat is evolved—indicating that the bisulfite has formed an adduct with the quinone.

EXAMPLE 14

Preparation of a Polymer With Integral Carbonyl Groups

A cross-linked polyvinyl alcohol is oxidized at room temperature with a Jones reagent (see "Reagents for Organic Synthesis", Fieser & Fieser, J. Wiley & Sons, N.Y., 1967, Vol. 1, pp. 142–144) to form a cross-linked vinyl ketone. This compound is expected to be useful as a macroreticular compound containing carbonyl functional groups integral with the backbone of the compound.

What is claimed is:

1. A process for removal of bisulfite salt from an aqueous feed solution thereof which comprises contacting said aqueous feed solution with a macroreticular solid organic compound, there being at least 0.1 milliequivalent of adduct-forming carbonyl functional group per gram of compound to form an adduct of said bisulfite salt with said compound, and withdrawing the resulting residual aqueous solution from contact with said bisulfite-adducted compound.

2. A process as in claim 1 wherein the adduct formation occurs in an adduct formation zone at adduct formation conditions including:
   (a) a temperature in the range from about 0° C. to about 200° C.,
   (b) a pH in the range from about 1 to 8, and
   (c) a pressure at least sufficient to maintain said solution.

3. A process as in claim 1 with the additional step of regenerating said bisulfite-adducted compound by removing sulfur dioxide therefrom.

4. A process as in claim 3 wherein said regenerating is effected by heating.

5. A process as in claim 3 wherein said regenerating is effected at a temperature in the range from about 90° to 160° C. using steam.

6. A process for removing a bisulfite salt from an aqueous feed solution thereof, comprising:
   (1) contacting said solution with a macroreticular organic compound in an adduct-formation zone, there being at least 0.1 milliequivalent of a bisulfite adduct-forming carbonyl functional group per gram of compound, said contacting being:
      (a) at a temperature in the range from about 0° C. to about 200° C.,
      (b) at a pH in the range from about 1 to 8, and
      (c) at a pressure at least sufficient to maintain said solution;
   (2) withdrawing the resulting residual aqueous solution from contact with said macroreticular compound; and
   (3) regenerating said macrorecticular compound by treating said contacted compound under sulfur dioxide-releasing conditions.

7. A process as in claim 6 wherein said contacting is carried out at a temperature of about 5° to 150° C., said regenerating is effected at a temperature in the range from about 0° to 160° C.

8. A process as in claim 7 wherein said contacting is at a temperature in the range from about 20° to 140° C. and said regenerating is at a temperature in the range from about 100° to 150° C.

9. A process as in claim 6 wherein said regenerating is effected using steam.

10. A process as in claim 6 wherein said carbonyl functional groups are selected from the group consisting of formyl, ketonyl, cyclohexanonyl, acetyl, and perfluoroacetyl and wherein said compound contains at least about 3 milliequivalents per gram thereof of said carbonyl groups.

11. A process as in claim 6 wherein said compound is an organic polymer.

12. A process as in claim 11 wherein said polymer is macroreticular cross-linked polyacrolein.

13. A process as in claim 11 wherein said polymer is macroreticular cross-linked dialdehyde starch.

14. A process as in claim 6 wherein concurrent with said contacting, said feed solution is generated in said adduct-formation zone by introducing a sulfur dioxide-contaminated gas into an aqueous gas-scrubbing solution therein, said scrubbing solution containing at least one reactant selected from the group consisting of ammonium, magnesium and alkali metal sulfites, carbonates, hydroxides, and mixtures thereof.

15. A process as in claim 14 wherein said reactant is sodium sulfite.

16. A process for removing sulfur dioxide from a sulfur dioxide-contaminated gas which comprises forming an aqueous solution of a bisulfite salt by reacting said sulfur dioxide with a reactant and contacting said salt with adduct-forming carbonyl functional groups in a macroreticular solid organic compound containing at least 0.1 milliequivalent of functional group per gram of compound to form an adduct of said bisulfite salt with said compound, said withdrawing the resulting residual aqueous solution from contact with said bisulfite-adducted compound.

17. A process as claimed in claim 16 wherein said bisulfite salt is formed by contacting in a gas scrubbing zone said gas with an aqueous scrubbing solution, said scrubbing solution containing at least one reactant selected from the group consisting of ammonium, magnesium and alkali metal sulfites, carbonates, hydroxides and mixtures thereof.

18. A process as in claim 16 wherein said adduct formation occurs in an adduct formation zone at adduct formation conditions including:
   (a) a temperature in the range from about 0° C. to about 200° C.
   (b) a pH in the range from about 1 to 8, and
   (c) a pressure at least sufficient to maintain said solution.

19. A process as in claim 16 with the additional step of regenerating said bisulfite-adducted compound by removing sulfur dioxide therefrom.

20. A process as in claim 19 wherein said regenerating is effected at a temperature in the range from about 100° to 160° C. by contacting said bisulfite salt-adducted compound with steam.

21. A process for recovering sulfur dioxide from a sulfur dioxide-contaminated gas, comprising:
(1) forming a bisulfite-enriched solution and a residual gas by contacting in a gas scrubbing zone said gas with an aqueous scrubbing solution, said solution containing at least one reactant selected from the group consisting of ammonium, magnesium and alkali metal sulfites, carbonates, hydroxides and mixtures thereof, said residual gas containing less sulfur dioxide per unit volume than said gas;
(2) removing bisulfite salt from said enriched solution by contacting said solution with a macroreticular compound in a adduct-formation zone, there being at least about 0.1 milliequivalent of a bisulfite salt adduct-forming carbonyl functional group per gram of compound, and said contacting being
(a) at a temperature in the range from about 0° C. to about 200° C.,
(b) at a pH in the range from about 1 to 8, and
(c) at a pressure at least sufficient to maintain said solution;
(3) withdrawing the resulting residual aqueous solution from contact with said macroreticular compounds; and
(4) regenerating said macroreticular compound by treating said contacted compound under sulfur dioxide-releasing conditions.

22. A process as in claim 21 wherein (1) said gas-scrubbing solution comprises aqueous sodium sulfite, (2) said contacting in said bisulfite salt adduct-formation zone is carried out at a temperature in the range from about 5° to 150° C. (3) said regenerating is effected at a temperature in the range of about 0° to 160° C. by contacting said bisulfite salt-adducted compound with steam.

23. A process as in claim 21 wherein said macroreticular compound is an organic polymer.

24. A process as in claim 23 wherein said polymer is macroreticular cross-linked polyacrolein or dialdehyde starch, said polymer containing at least about 3 milliequivalents of said carbonyl group per gram thereof.

25. A process as in claim 23 wherein said polymer is macroreticular cross-linked polyacrolein and said regenerating is at a temperature in the range from about 100° to 150° C.

* * * * *

UNITED STATES PATENT AND TRADEMARK OFFICE
CERTIFICATE OF CORRECTION

PATENT NO. : 4,196,175

DATED : April 1, 1980

INVENTOR(S) : Harbo P. Jensen

It is certified that error appears in the above-identified patent and that said Letters Patent are hereby corrected as shown below:

Cols. 9-10, footnote at end of table should read
--[1]Determined by the mercury porosimetric method.--

Col. 14, line 44, Claim 16, "said withdrawing" should read --and withdrawing--.

Signed and Sealed this

Twenty-second Day of July 1980

[SEAL]

Attest:

SIDNEY A. DIAMOND

Attesting Officer

Commissioner of Patents and Trademarks